July 2, 1946.  T. ULRICH  2,403,145
WHEEL AND MOTOR SUSPENSION, ESPECIALLY FOR AUTOMOBILES
Filed July 17, 1941  4 Sheets-Sheet 2
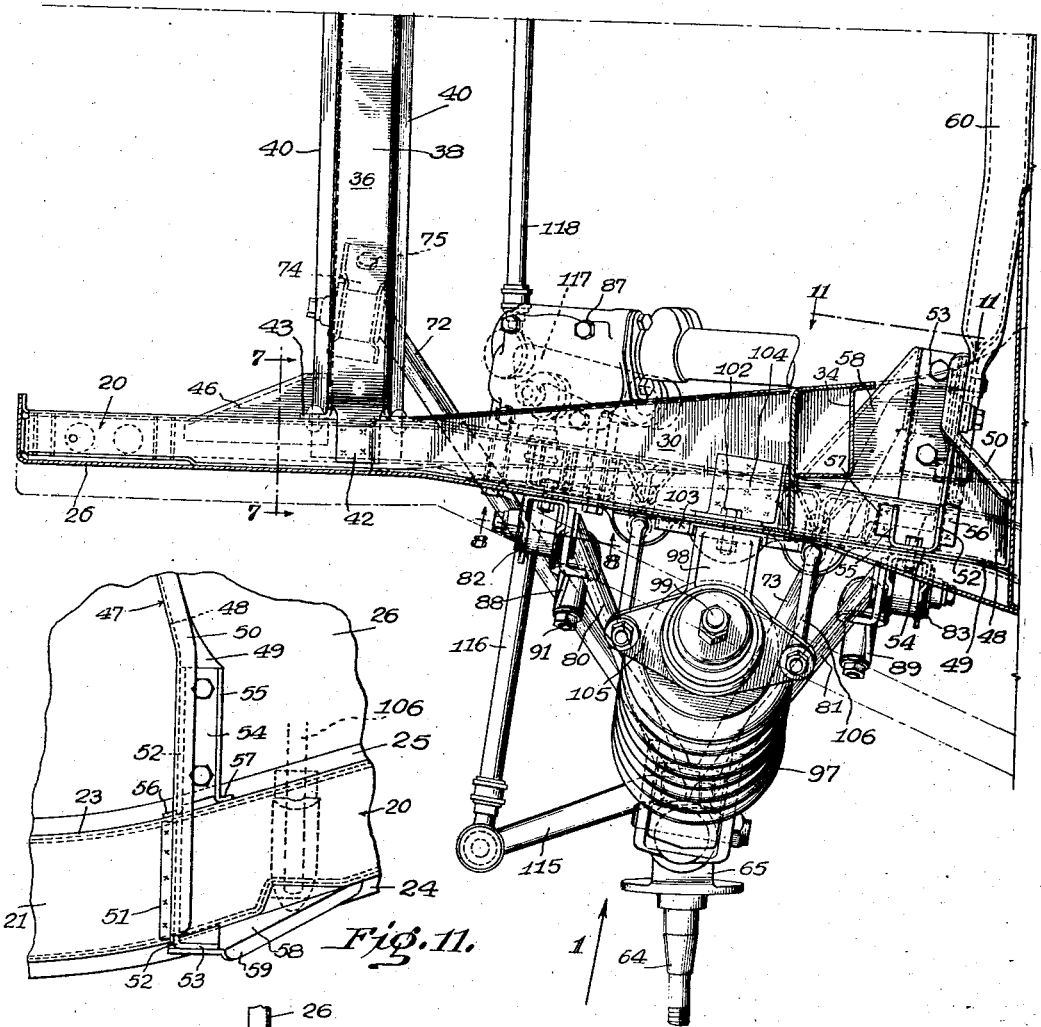
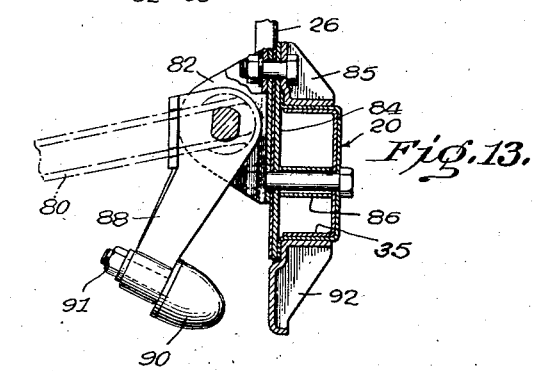
INVENTOR
Theodore Ulrich
BY John P. Tarbox
ATTORNEY July 2, 1946.  T. ULRICH  2,403,145
WHEEL AND MOTOR SUSPENSION, ESPECIALLY FOR AUTOMOBILES
Filed July 17, 1941  4 Sheets-Sheet 3
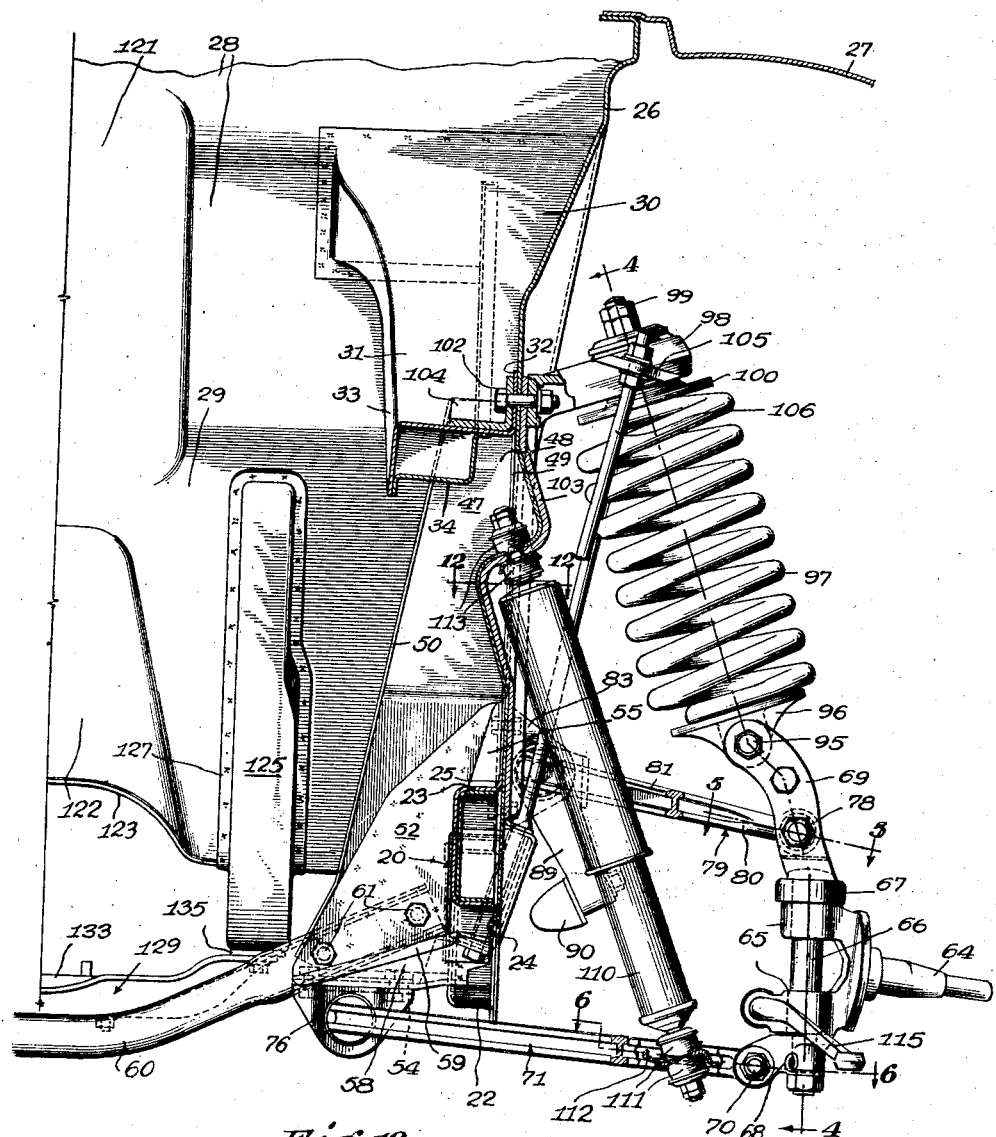
INVENTOR
Theodore Ulrich
BY John P. Turbox
ATTORNEY

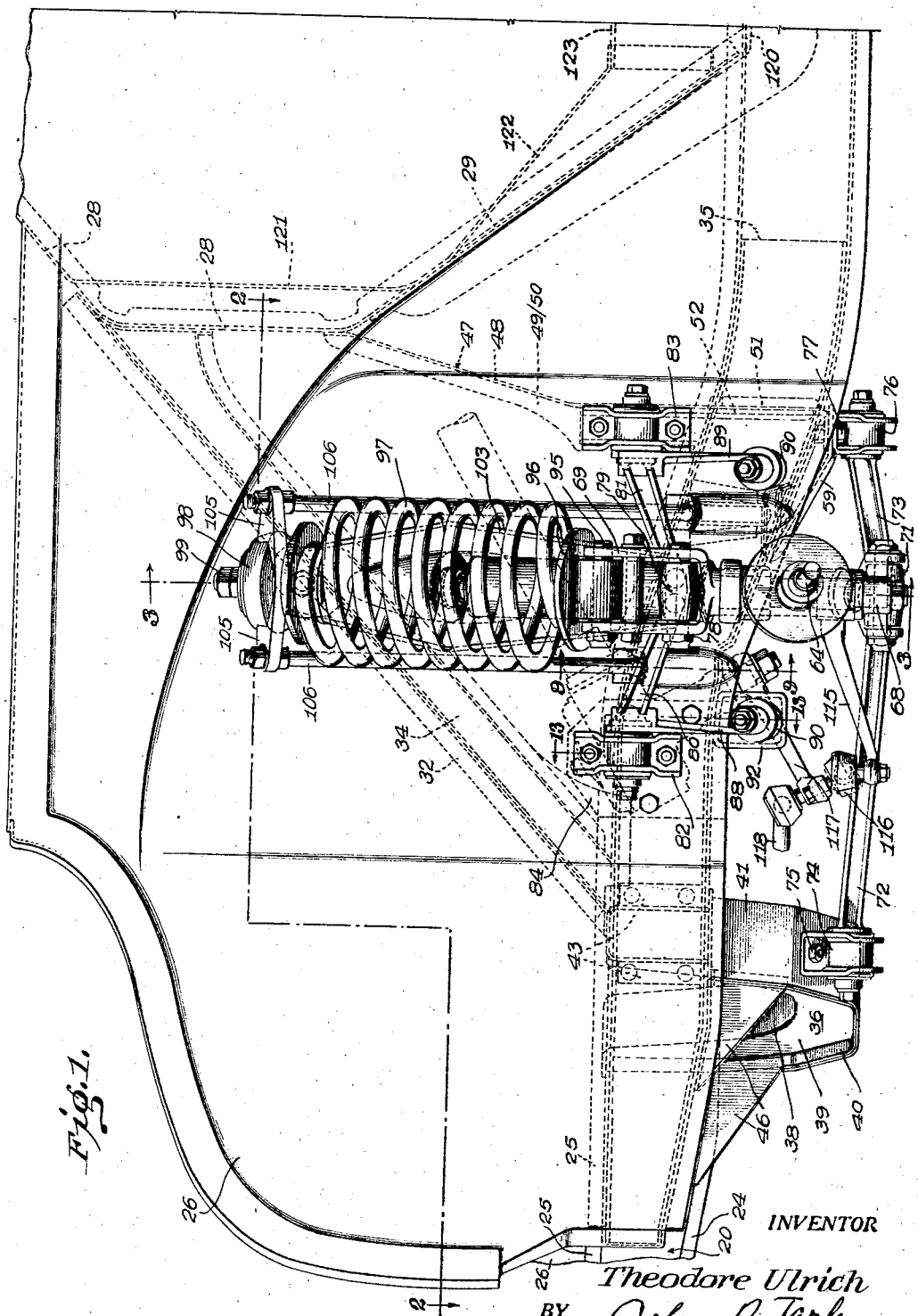

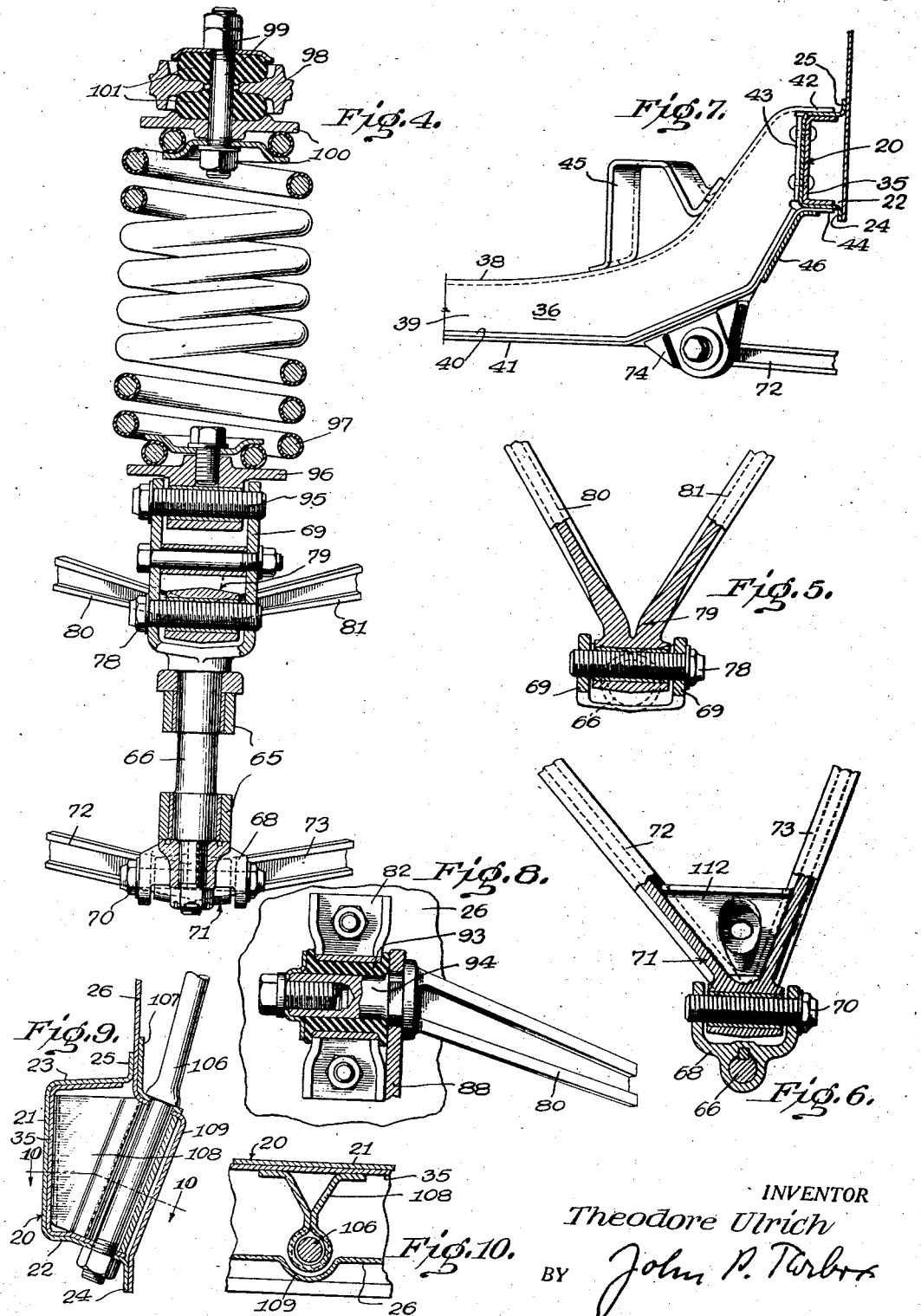

Patented July 2, 1946

2,403,145

UNITED STATES PATENT OFFICE 2,403,145

WHEEL AND MOTOR SUSPENSION, ESPECIALLY FOR AUTOMOBILES

Theodore Ulrich, Milwaukee, Wis., assignor to Edward G. Budd Manufacturing Company, Philadelphia, Pa., a corporation of Pennsylvania Application July 17, 1941, Serial No. 402,877

6 Claims. (Cl. 296—28)

The invention refers to vehicle wheel and motor suspension, and more particularly to such suspension for a body of the self-sustaining type.

It is among the objects of the invention to simplify the construction of the vehicle as far as the wheel and motor suspension and adjacent parts are concerned.

A further object of the invention is to reduce the weight of the vehicle without decrease but rather accompanied by an increase of strength.

The invention has outstandingly to do with the front wheel and the motor suspension for self-sustaining bodies of the type disclosed in the inventor's applications Serial No. 191,396, filed February 19, 1938, for End wall construction for vehicle bodies, now Patent No. 2,289,395; Serial No. 299,595, filed October 16, 1939, for Vehicle body, now Patent No. 2,383,029; Serial No. 349,922, filed August 2, 1940, for Vehicle structure especially tonneau bottom structure, now Patent No. 2,370,211; Serial No. 440,131, filed April 23, 1942, for Vehicle body, now Patent No. 2,386,280, as a division of the present application; in the application of Deisley, Ulrich and Lindsay, Serial No. 349,704, filed August 2, 1940, for Vehicle structure especially vehicle front end structure, now Patent No. 2,380,031; and in the inventor's simultaneously filed application, Serial No. 402,878, filed July 17, 1941, for "Body for vehicles especially for pleasure automobiles."

The main features of the invention consist in the arrangement of the front wheel suspension and the motor suspension for an automobile in such a manner that the stresses are evenly distributed into the self-sustaining combined body and chassis structure.

Other features consist in improvements of the combined body and chassis structure itself by which greater strength and rigidity is attained and the attachment of the wheel suspension and/or the power unit facilitated and improved.

Other objects and advantages of the invention, as well as its details, will become apparent from the following description of some embodiments when read in connection with the attached drawings.

In the drawings:

Figure 1 is a fragmentary side elevation of the front end of an automobile and the attached wheel suspension, viewed in the direction of the arrow 1 of Figure 2, the front wheel itself with its hub and the fender being omitted so as not to cover up the essential parts of the invention;

Figure 2 is a fragmentary plan view of the parts shown in Figure 1, partly in section along line 2—2 of Figure 1;

Figure 3 is a fragmentary front elevation of the wheel suspension and adjacent body parts, shown in Figures 1 and 2, partly in section along line 3—3 of Figure 1;

Figure 4 is a generally vertical section through certain parts of the wheel suspension along line 4—4 of Figure 3;

Figures 5 and 6 are fragmentary, generally horizontal sections through portions of the wheel suspension, taken along the correspondingly numbered lines of Figure 3;

Figure 7 is a fragmentary front elevation, partly in section along line 7—7 of Figure 2;

Figure 8 is a fragmentary view partly in section along line 8—8 of Figure 2, viewed in the direction of the arrows at the ends of the section line;

Figure 9 is a fragmentary, vertical section along line 9—9 of Figure 1;

Figure 10 is a fragmentary, generally horizontal section along line 10—10 of Figure 9;

Figure 11 is a fragmentary inside elevation in the region of line 11—11 of Figure 2;

Figure 12 is a fragmentary, horizontal section along line 12—12 of Figure 3, through the body wall in the region of the shock absorber connection, the shock absorber being indicated by a dot-and-dash line; and Figure 13 is a fragmentary section along line 13—13 of Figure 1.

The construction of the self-sustained combined body and chassis structure, part of which is shown in the drawings, is in principle largely the same as disclosed in the before-mentioned applications, especially in the Patent No. 2,380,031 and the inventor's simultaneous application Serial No. 402,878, "Body for vehicles, especially for pleasure automobiles."

The front end structure of the body comprises outwardly facing channel-section sill members 20 with a bottom wall 21, a lower side wall 22, an upper side wall 23, and marginal flanges 24, 25. These sill members 20 are connected to and rearwardly continued by similarly shaped sill members (not shown). The flanges 24, 25 serve for fastening, such as by electric spot welding, each member 20 to the adjacent body side wall panel 26 which constitutes, in the front region, the skirt of the wheel housing, and is covered in the finished car by the fender 27, a fragmentary part of the latter being shown in section in Figure 3. The details of the fender arrangement are disclosed in the inventor's aforesaid simultaneously filed application Serial No. 402,878, "Body for vehicles, especially for pleasure automobiles."

The side wall panels 26, on different sides of the car, are interconnected by the dash board 28 and the toe board 29. The forward portions of the sill members 20, and the side panels 26 are braced by upwardly and rearwardly inclined members 30. The members 30 are Z-shaped in section having a web 31, an outer arm 32 and an inner arm 33. The outer arm 32 overlies and is fastened to the inner side of the panel 26, such as by spot welding. The margin of the inner arm 33 is connected to a flanged angle-section member 34, which latter forms with the web 31 and the flange 33 of the member 30, a box section structure. The upper ends of the members 30 and 34 are rigidly connected to the dash board 28, and their lower ends to the sill member 20. The general arrangement of the dash and toe boards 28, 29 and of the reinforcements 30, 34, and the connection of these members to the side panels 26 and to the sill members 20, are substantially the same as described, for instance, in the aforesaid Patent No. 2,380,031.

Each side sill member 20 is reinforced in its interior by a channel-section member 35 which extends from the front end of the sill members to a point slightly behind the dash board 28. In the region of the connection between the side sill members 20 and the inclined reinforcements 30, 34, a cross sill 36 is inserted. This cross-member consists of a downwardly-facing channel-section member with an upper bottom wall 38, side walls 39 and marginal flanges 40. The open mouth of the member 36 is closed by a strip 41 which is fastened, such as by electric spot welding, to the flanges 40. The ends of the member 36 are provided with extensions 42 and tongues 43 by means of which they overlap and are fastened to the side sill members 20. The member 41 likewise overlaps with its end extension 44 the side sill 20 and is fastened thereto. The cross-member 36 is downwardly bent between the two side sill members 20 so as to make room for the motor unit. Brackets 45 on the cross-member 36 serve for the support of the front end of the motor unit by means of resilient cushions (not shown). The connection between the cross-member 36 and the side sill members 20 is further reinforced by triangular brackets 46, generally angle-shaped in cross-section. One arm of these brackets overlaps and is fastened to the member 41 of the cross-member 36, whereas the other arm overlaps and is fastened to the bottom wall 22 of the side sill member 20 except for the region of the extension 44 of the member 41 where the second arm overlies said extension (Figures 1, 2 and 7).

A bracket plate 47 on each side of the body, having a generally transversely and vertically arranged web 48 and marginal forwardly directed flanges 49 and 50, has its upper end attached to the lower marginal portion of the dash board 28. The flange 49 of this plate is fastened to the adjacent side panel member 26. In the lower region, the member 47 is cut out and overlaps and is fastened to the inner wall 21 of the side sill member by means of a rearwardly directed flange 51.

The lower portion of each plate 47 is reinforced by a second plate 52 which overlaps and is fastened, such as by spot welding, to the web 48 of the plate 47. The lower margin of the plate 52 is provided with a forwardly directed flange 53 and the outer margin with a forwardly directed flange 54, which latter is continued by an inwardly directed flange 55. The flange 54 overlaps and is fastened to the flange 49 of the plate 47. The main body of the plate 52 is cut out so as to accommodate the side sill member 20, and the cut-out portion as well as the flange 55 are provided with tabs 56, 57 which overlie and are fastened to the top wall 23 of the side sill member 20.

A third bracket plate 58 underlies and is fastened to the flange 53 of plate 52 and the bottom wall 22 of the adjacent side sill member 20. The rearwardly and inwardly inclined forward margin of the plate 58 is reinforced by a downwardly directed flange 59.

In the region of the overlap between the plates 47 and 52, a transverse tubular member 60 is fastened by means of bolts 61. The structure composed of the plates 47, 52, 58 and the cross-member 60 affords a very substantial reinforcement for the combined body and chassis construction in this region for a purpose which will become apparent from the following description of the wheel suspension proper.

Each of the two front wheels (not shown) is rotatably supported on a stub axle 64. The bifurcated inner portion 65 of each stub axle 64 is supported rotatably about a substantially vertical axis on a king pin 66 between an upper collar 67 and a lower collar member 68. Rigidly connected to and preferably forming one integral portion with the king pin 66 is an upwardly directed bifurcated extension 69.

Journalled at 70 to the member 68 is a V- or triangular-shaped link 71 having a forwardly and inwardly extending arm 72 and a rearwardly and inwardly extending arm 73. The inner end of the forward arm 72 is journalled in a bearing 74 which is secured by bolts 75 to the underside of the cross-member 36, 41. The inner end of the arm 73 is journalled in a similar bearing 76 which is fastened by bolts 77 to the underside of the plate 58 where the latter is reinforced by flange 53 of the plate 52.

Journalled to the king pin extension 69 at 78 is the apex of a second V- or triangular-shaped member 79 having likewise a forwardly and inwardly extending arm 80 and a rearwardly and inwardly extending arm 81. The inner ends of these arms 80, 81 are journalled in bearings 82, 83, respectively. The bearing 82 is bolted to the panel 26 and the sill member 20, which latter are reinforced in this region by a plate 84, a bracket 85, and a bolt spacer 86. In the same reinforced region of the panel 26 and the side sill member 20, the steering gear 87 is fastened. The bearing 83 is bolted to the side panel 26 in the region where the latter is reinforced by the flange 49 of the plate 47 and the flanges 54, 55 of the plate 52.

The inner ends of the arms 80, 81 of the upper link 79 are rigidly connected or integrally formed with short downwardly extending levers 88, 89. The free ends of these levers are provided with an exchangeable rubber cushion 90 which may be held by bolt and nut 91. Excessive downward movement of the links 81 will bring the cushions 90 in contact with the bracket 92—Figure 13—attached to the side sill member 20, or with the panel 26, respectively.

The connections between the links 71, 79 and the king pin portions 68, 69 may be of any conventional type, such as shown in Figures 5 and 6. The bearings 74, 76, 82 and 83 may comprise, as illustrated in Figure 8 for the bearing 82 and arm 80, a resilient bushing 93, such as a rubber bushing, in which the cylindrical end 94 of the respective link arm is arranged. These bushings allow sufficient swinging movement between the bearing and the arm, and they dampen vibrations and shocks transmitted from the wheel and associated parts.

Journalled to the king pin extension 69 by means of a bolt 95 is a plate 96 which holds and supports the lower end of a rubber-covered helical spring 97. The upper end of this spring is fastened to a bracket 98 by means of bolt and nuts 99, plates 100, and two rubber cushions 101. Due to the rubber cushions 101 the transmission of vibrations from the wheel and its suspension to the adjacent structure is likewise prevented. The bracket 98 has its inner end fastened by bolts 102 to the side panel 26 and the inclined brace 30. The side wall is reinforced in this region by a welded-on heavy outer stamping 103, and the brace 30 is reinforced by a welded-on angle-section bracket 104.

The bracket 98 is provided on both sides of its connection to the spring 97 with wings 105. Stay bolts 106 extend through holes of and are fastened to these wings 105. The stay bolts 106 have their lower ends extended through and fastened to the lower marginal portions of the panel 26 and to the sill members 20, 35. In the region of the connection of the lower end of each stay bolt 106, the outer panel is reinforced by a plate 107, and the panel and the sill are reinforced in the interior by a bolt spacer and reinforcing bracket 108. The panel 26 has outwardly directed projections 109 which accommodate the lower ends of the stay bolts 106 and the spacers 108.

A shock absorber 110 of the so-called airplane type, has its lower end resiliently connected by rubber cushions 111 to a web 112 provided in the angle between arms 72, 73 of the lower link 71. The upper end of the shock absorber is fastened by means of rubber cushions 113 in a recess 114 of the reinforcing member 103 and of the panel 26, Figures 3 and 12.

The stub axle part 65 is rigidly connected to a steering lever 115, the outer end of the latter being journalled to a link 116. The link 116 is journalled to a lever 117 of the steering gear 87. A second link 118 is likewise journalled to lever 117 and serves for moving the second (not shown) wheel and stub axle on the other side of the vericle.

The dashboard 28, the toe board 29 and the rearwardly adjacent portions 120 of the body floor panel proper all have their central portions 121, 122, 123, respectively, rearwardly and upwardly bent so as to make room for the rear portions of the power unit. Parts of these portions 121, 122, 123 may be constituted by a customary removable cover (not shown) giving access to the change-speed gear and the clutch of the power unit 124.

At both sides of the portions 121, 122, 123 reinforceing members 125 are arranged which extend over a part of the vertical portion of the dashboard 28, over the toe board 29 and the forward portion of the floor panel 120. Each member 125 is a channel having marginal flanges 127 by which it is fastened such as by spot welding to the panels 28, 29 and 120. The substantially horizontal rear portions of the members 125 are interconnected by a brace 129 the central portion of which is downwardly bent and provided in its interior with a rubber block (not shown) carrying a supporting plate 133 for the rear end of the motor unit.

The attached drawings show and the foregoing specification described often the construction on the one side only of a longitudinal or transverse plane of symmetry, because it is deemed unnecessary to encumber the drawings and specification where the complementary structure on the other side of such plane is quite obvious to anyone skilled in the art.

It will be understood that the invention is liable to many modifications without departure from its principles. For instance, the new system of transmitting the stresses directly into the body panels may be applied to other types of wheel suspensions than those shown in the drawings, and it is not only applicable to front and steering wheels.

All those modifications and adaptations of the invention are intended to be covered by the appended claims.

What is claimed is:

1. In a self-sustaining vehicle body- or combined vehicle body- and chassis-structure; a dash board and a toe board extending rearwardly and downwardly from the dash board, side panels connected to the lateral margins of said dash and toe boards, wide webs attached to said side panels and said toe board and arranged in an upright plane extending transversely to the longitudinal direction of the body structure from the upper region of the toe board downwardly and toward the longitudinal middle line of the body, said panels constituting main structural stress-transmitting parts of said structure, parts of the running gear being fastened to said panel in the regions where they are reinforced by said webs.

2. In a self-sustaining vehicle body- or combined vehicle body- and chassis-structure; a dash board and a toe board panel, the latter extending rearwardly and downwardly from the lower margin of the former; side wall structures connected to the lateral margins of said dash and toe board panel; a pair of wide webs arranged generally in a substantially vertical plane transversely to the longitudinal extent of the body and each having one of its margins attached to one of said side wall structures and another margin to the dash and toe board panel near the upper region of the toe board and extending downwardly from said region; a horizontal extension of each web along its lower margin, said extension having its margin likewise fastened to the adjacent side wall structure; parts of the running gear being fastened to said side wall structures in the regions where they are reinforced by said vertical webs and other parts of the running gear being fastened to the horizontal extensions of said webs.

3. In a self-sustaining vehicle body or combined vehicle body- and chassis-structure; a dash board panel, a rearwardly and downwardly inclined toeboard panel; side panels extending beyond and connected to the lateral margins of said dash and toe board panels; a pair of elongated reinforcing webs extending in side elevation from points beyond said dash board panel and near the underside of the structure upwardly toward a portion of the dash board panel at a substantial distance above the upper edge of the toe board panel; the side margins of said webs being fastened to the extended portions of said side panels and upper ends of said webs being fastened to said dash board panel; said dash board panel being downwardly extended at its lateral ends by a second pair of webs arranged in about the same plane as the dash board panel;

said webs of the second pair having their side margins likewise attached to said side panels and their upper ends to said dash board panel, said two pairs of webs strongly reinforcing the front end of said structure but leaving between them sufficient space for a power unit.

4. In a self-sustaining vehicle body- or combined vehicle body- and chassis-structure; a dash-board panel and a toe board panel, the latter extending rearwardly and downwardly from the former; side panels connected to the lateral margins of said dash and toe board panels; a pair of webs attached to said panels and extending in a plane transversely to the side panels from the upper region of the toe board panel downwardly and toward the longitudinal middle line of the body; parts of the running gear being fastened to said panels in the regions where they are reinforced by said webs; a transverse member being attached to and interconnecting the lower portions of the webs.

5. In a self-sustaining vehicle body- or combined vehicle body- and chassis-structure; a body end wall, body side walls extending beyond said end wall, elongated reinforcing webs arranged with their main plane uprightly and transversely to the longitudinal direction of the structure and extending in side elevation from points beyond said end wall and near the underside of the structure upwardly toward a portion of the end wall above the under side of the structure, said webs having their side margins fastened to the extended portions of said side walls and their upper ends to said end wall, wheel suspension means being fastened to said side walls in regions where they are reinforced by said webs.

6. In a self-sustaining vehicle body- or combined vehicle body- and chassis-structure; a body end wall, body side walls having portions extending beyond said end wall so as to form with said end wall a compartment; elongated reinforcing members extending in side elevation from points beyond said end wall and near the underside of the structure upwardly to points of the end wall considerably above the underside of the structure; longitudinal sill members structurally connected to said extended side wall portions and also to the lower ends of said reinforcing members; reinforcing plates, one on each side of the body structure, structurally fastened to said side wall portions, sill members and reinforcing members, each plate bridging the space between one of said sill members and one of said reinforcing members in a region spaced from the connecting point between said reinforcing and said sill members and adapted for the connection of part of the running gear of the vehicle such as springs and shock absorbers.

THEODORE ULRICH.